United States Patent [19]

Wurzer

[11] 4,432,718
[45] Feb. 21, 1984

[54] EXTRUSION HEAD

[75] Inventor: Ernst Wurzer, Konigswinter, Fed. Rep. of Germany

[73] Assignee: Mauser-Werke GmbH, Bruhl, Fed. Rep. of Germany

[21] Appl. No.: 320,507

[22] Filed: Nov. 12, 1981

[30] Foreign Application Priority Data

Nov. 15, 1980 [DE] Fed. Rep. of Germany ....... 3043228

[51] Int. Cl.³ .................................................. B29F 3/04
[52] U.S. Cl. .................................... 425/466; 264/541;
264/167; 264/209.2; 425/192 R; 425/381;
425/467
[58] Field of Search ............... 425/466, 465, 467, 381,
425/380, 192 A; 264/541, 167, 209.2, DIG. 33

[56] References Cited

U.S. PATENT DOCUMENTS

| | | | |
|---|---|---|---|
| 3,209,404 | 10/1965 | Hagen | 425/466 |
| 3,346,918 | 10/1967 | Deleuze et al. | 425/465 |
| 3,649,148 | 3/1972 | Waltman et al. | 264/541 |
| 3,690,798 | 9/1972 | Raspante | 264/167 |
| 3,932,090 | 1/1976 | Brumlik | 425/465 |
| 4,124,351 | 11/1978 | Garbuio | 425/532 |
| 4,279,857 | 7/1981 | Feuerherm | 264/541 |

FOREIGN PATENT DOCUMENTS 2610668 9/1977 Fed. Rep. of Germany .
2654001 6/1978 Fed. Rep. of Germany .

*Primary Examiner*—Jeffery R. Thurlow
*Attorney, Agent, or Firm*—Pennie & Edmonds

[57] ABSTRACT

An extrusion head with an annular extrusion die gap or orifice for fabricating a hollow extrudate of thermoplastic material. The extrusion head has a central die core and outer die casing ring cooperating to define the die gap. The inner boundary of the die gap is formed by a wall of the die core, while the outer boundary of the die gap is formed by a wall of the casing ring. At least one boundary wall of the die gap comprises independently movable sections that move with respect to the other boundary wall to change the width of the die gap.

4 Claims, 2 Drawing Figures

EXTRUSION HEAD

BACKGROUND OF THE INVENTION

1. Field of the Invention

The invention relates to an extrusion head having a central die core and outer die casing ring cooperating to define an annular exit gap or orifice for fabricating hollow extrudates. The cross-sectional dimension of the gap is uniformly changeable by axial displacement of the die core and/or the die casing ring relative to each other; and one or both of the die members is segmented with each segment adjustable to vary the cross-sectional dimension of the gap at prescribed points circumferentially about the gap.

2. Description of the Prior Art

Extrusion heads have been developed where the die gap of the exit die is changed in the circumferential direction at prescribed points to attain a specified distribution of wall thickness in the hollow extrudate. This is desirable, for example, when blow molding a preform of hollow extrudate between the segments of a blow mold cavity. There, when the extrudate is clamped by the mold segments, the extrudate will traverse different stretch paths in the area of the mold clamping points than in the remaining portions of the mold. When an extrudate of uniform wall thickness, the walls of the finished blown product will have variable thickness in relation to the extent to which the extrudate stretches at different locations within the mold.

By means of a specific distribution of wall thickness in the extruded preform, it has been possible to balance out weak or thin areas that would otherwise be created during the blow molding process. This has been accomplished by extruding the preform with a wall thickness of different dimensions in such a manner that the wall is thicker in areas of longer stretch paths and thinner in areas of shorter stretch paths. Thus, after the blow molding process has been completed, that is when the stretch of the material has terminated, the hollow body that is formed will have walls of equal thickness.

In one prior method, a flexible die casing ring has been placed adjacent the exit of the annular die, as disclosed in DT-OS No. 26 54 001. In order the change the annular gap of the die at prescribed points, this ring is deformed in the radial direction within its elastic range through the action of tension and pressure screws. According to another method disclosed in DT-PS No. 1 161 412, the die casing itself is elastically deformable in the radial direction at prescribed points. In order to avoid joints between the deformed die ring and the recesses of the housing, in which the ring is guided, a ring lining is here inserted between the ring and the hollow extrudate as disclosed in DT-OS No. 26 10 668.

Prior attempts at a solution require the application of considerable deformation forces to the casing die ring. The wall thickness of the ring must be sufficient to withstand the high mechanical and thermal die stresses created during the extrusion processes. Furthermore, such a deformable ring must be capable of springing back into its original circular shape when it is relieved from deformation forces. Consequently, for these reasons, the wall thickness of the die ring may not fall below a certain value.

A further disadvantage of prior ring constructions relates to possible warping. When a closed ring is deformed, the circumferential length of the ring remains constant. Pressing in at one point of the ring can simply cause an undesirable bulging out at another point, so that there is merely a change of shape of the ring rather than a controllable change in diameter.

The larger the volume of the container that is being fabricated by the blow molding process, the more material must be utilized. Consequently, there will be a larger aggregation of excess material at the critical points behind the mold separation seams formed by the clamped segments of the mold. For this reason, in order to constrict the die gap to form thin extrudate at the selected points, the associated ring areas must traverse comparatively large deformation movement at these same points. The heavier the design of the ring cross-section, the less is its deformation capability, so that the deformation that can finally be achieved is not sufficient to remove sufficient material at the desired extrudate points. Under extreme operating conditions, the ring can experience permanent material fatigue, which will cause the ring to break, or permanently deform, which renders the ring useless. With the prior art constructions, it is therefore only possible to provide for a few force application points for deforming the ring over its circumference.

In the prior art techniques for changing the die gap in the circumferential direction at prescribed points, the mode of behavior of the plastic in the flowable state has been a decisive factor. The assumption has been that smooth continuous extruding surfaces of the die gap were needed to create smooth thickness changes in the wall thickness of the extruded preform material. Consequently, the prior techniques provided for smooth transitions in the local displacement regions of the gap. The most favorable smooth transitions were produced by radial deformation of the die casing ring in the elastic range of the ring material. Therefore, the above-described disadvantages of limited constriction of the die gap and a limited number of constriction points about the die gap periphery had to be accepted.

SUMMARY OF THE INVENTION

In accordance with the teachings of the present invention, smooth transitions in the extruded preform can be created without requiring a single deformable die casing ring or similar structure for providing the extruding surfaces of the die core or die ring with smooth transition surfaces. More particularly, at least one of the boundary walls of the die core and die casing ring that define the die gap comprises abutting movable sections disposed in side by side relation around the gap periphery. In one embodiment, the die core is solid while the die casing ring is made up of the movable sections.

DESCRIPTION OF THE PREFERRED EMBODIMENTS

Figure 1:
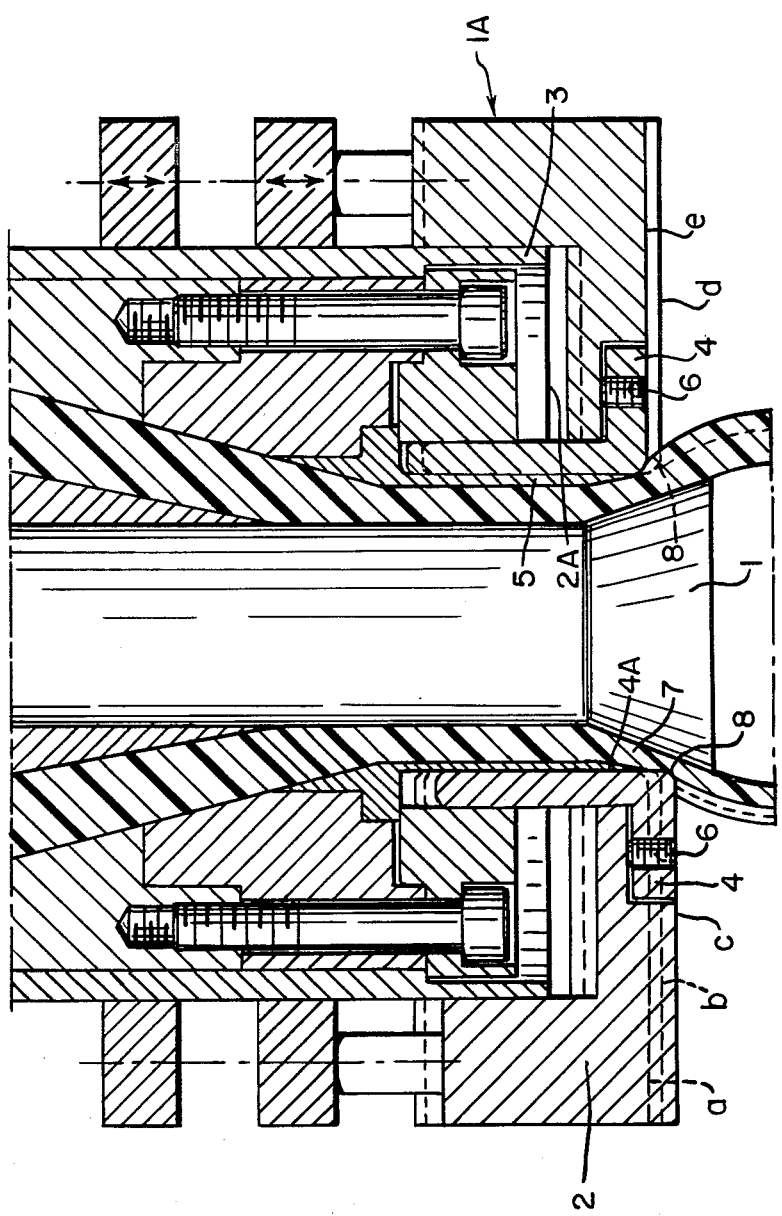
FIG. 1 is an elevational cross-sectional view taken through the centerline of the extrusion head.
Figure 2:
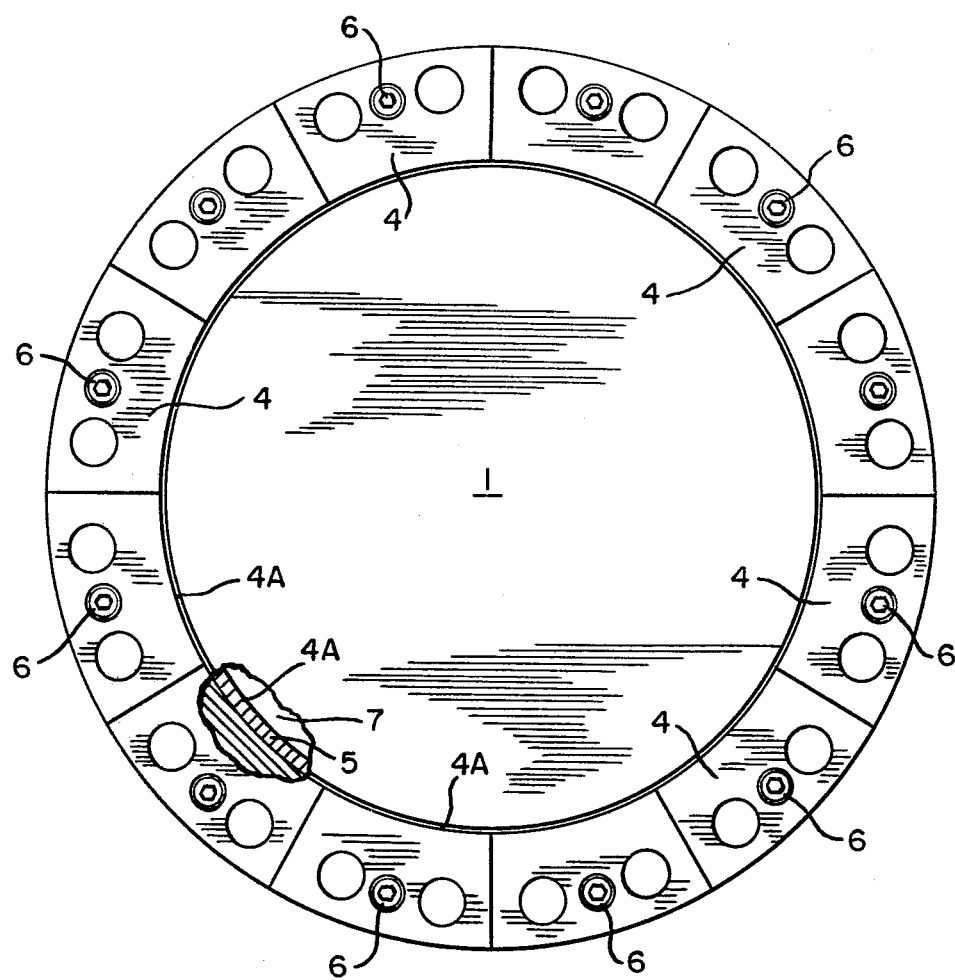
FIG. 2 is a lower plan view of the extrusion head showing the sectioned construction of the die casing ring.

The die core 1 is formed by the mandrel of the extrusion head 1A. The mandrel moves in the axial direction. The casing ring 2 of the extrusion head also moves in the axial direction and is attached to the exit end 2A of the extrusion head housing 3. As is conventional, the die core 1 is shown as having a lower end with a tapered surface extending radially outwardly as measured in the axial direction along which material is to be extruded. Thus, relative axial displacement of the die core and casing ring will change the thickness of the extrudate being formed.

In accordance with the teachings of the present invention, the die casing ring is constructed with separate sections 4 mounted about the inner periphery of the casing ring 2. Each section is L-shaped with one leg extending in an axial direction and having a wall surface 4A facing the inner die core 1. The other leg extends in a radially outward direction and defines the lower end of the die casing ring. The legs are joined at the edge 8 which forms the lower boundary wall of the casing ring 2. A guide ring 5 is fastened in the housing 3 of the extrusion head 1A and partially covers the axially extending legs of the sections 4. The guide ring 5 has a radially inwardly facing wall that contacts the extrusion material and provides a smooth inner surface for the die casing ring in the adjusted positions of the sections 4 as will be more fully evident from the following description.

Each of the die ring sections 4 is axially adjustable by means of positioning screws 6 so that the lower outer boundary edge of the radially opposed portion of the die gap can be changed accordingly. Specifically, the die gap opening at each die section around the gap will depend on the height position to which the lower edge 8 of each section is set in relation to the opposed wall surface of the die core 1. The height position of the sections 4 are set individually or in groups. Accordingly, the extruded tube material, shown at 7, will have walls of variable thickness at prescribed points and in accordance with the adjustment of each section 4. The thickness of the extrudated tube material will thus increase or decrease as a result of changes of the tube's outer circumference, while the internal contour of the tube will remain the same. The inner circumference and the overall thickness of the tube is, on the other hand, changed symmetrically by changing the axial or height adjustment of the solid die core 1 relative to the casing ring 2.

FIG. 1 shows various axial or height adjustments a, b, c, d, and e of the individual sections 4 and various height displacements of the casing ring 2. The corresponding thicknesses of the tubular preform material 7 are also shown. The sections 4 are adjusted to set the circumferential thickness distribution of the tubular preform material 7 as required for each blow molding process.

The guide ring 5 covers the upper ends of all of the sections 4 to form a smooth bridge between them and the axially adjacent wall of the die head. Accordingly, axial adjustment of the sections can be made without changing the wall surface along which the extrudate material moves except at the lower edges 8 of the sections where the die gap is to be controlled. The fact that only the lower end edges 8 of the sections 4 establish the die gap results in the shortest holding time for the thermoplastic material during the critical velocity range in the die gap. This is so because the paths over which the material experiences the highest flow speeds are kept short.

Instead of deforming the material of one of the die sections, the device according to the invention moves individual sections or groups of sections in order to locally change the dimension of the die gap. As a result, comparatively lesser displacement forces are needed to move the sections compared to the high displacement forces necessary to deflect the prior art type of casing rings. Thus, the sections may be moved over greater displacement ranges. They can also be moved in arbitrary fashion to produce corresponding arbitrary changes in the die gap width and frequency of change of gap width about the circumference of the gap. Although the transitions between the lower edges of the sections are discontinuous in accord with their height adjustment, no discontinuities occur on the surface of the hollow extrudate material. Instead, the transitions between the different thicknesses in the extrudate material are smooth and gradual.

Hydraulic devices, (not shown), change the axial height adjustment of the casing ring 2, as preprogrammed during the tube extrusion process. This produces a corresponding change in the axial setting of the lower edges 8 of all the sections 4 with respect to the outer surface of die core 1.

In accordance with the teachings of the present invention, it is to be understood that instead of having the die casing ring segmented into sections, the outer surface of the die core can be formed of individual sections which are adjustable with respect to a solid casing ring. Also, the die core and the die casing ring can both be formed of adjustable individual sections.

I claim:

1. In an extrusion head having a central axially extending die core member and an outer surrounding die casing ring member cooperating to define an annular die extrusion gap for fabricating a hollow extrudate, the die core member having a wall forming the inner boundary of the die gap and the casing ring member having a wall forming the outer boundary of the die gap, one of said walls having a tapered surface extending in said axial direction whereby relative axial movement of said members uniformly changes the radial thickness of the die gap, the improvement wherein:
   (a) at least one of the boundary walls forming the die gap includes a plurality of independently axially adjustable sections disposed in side by side relationship about the periphery thereof whereby axial adjustment of any section varies the local radial width of the die gap defined by that section; and
   (b) means to adjust the plurality of independently axially movable sections to change the die gap at any and all locations around the periphery of the die opening.

2. The improvement in the extrusion head according to claim 1, wherein:
   (a) the sections are comprised of individual segments disposed in side by side relationship about the entire periphery of at least one of said walls.

3. The improvement in the extrusion head according to claim 1, wherein:
   (a) the sections are comprised of individual L-shaped segments disposed in side by side relationship about the inner periphery of the casing ring wall, each L-shaped segment having:
      (i) one leg thereof extending in an axial direction and facing the inner die core, and
      (ii) the other leg extending radially outwardly of the die gap and defining the lower end of the die casing ring.

4. The improvement in the extrusion head according to claim 3, wherein:
   (a) a guide ring is disposed in covering relation over the upper ends of the one leg of each L-shaped segment and extends axially beyond said ends to provide a smooth inner surface for the die ring member with different axially adjusted positions of said segments.

* * * * *